(12) United States Patent
Ohki et al.

(10) Patent No.: US 9,487,192 B2
(45) Date of Patent: Nov. 8, 2016

(54) PARKING BRAKE DEVICE

(71) Applicant: HONDA MOTOR CO., LTD., Minato-ku, Tokyo (JP)

(72) Inventors: Takayuki Ohki, Wako (JP); Fumikage Yamanaka, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/646,790

(22) PCT Filed: Nov. 26, 2013

(86) PCT No.: PCT/JP2013/081786
 § 371 (c)(1),
 (2) Date: May 22, 2015

(87) PCT Pub. No.: WO2014/081039
 PCT Pub. Date: May 30, 2014

(65) Prior Publication Data
 US 2015/0298662 A1    Oct. 22, 2015

(30) Foreign Application Priority Data

Nov. 26, 2012  (JP) ................. 2012-257927

(51) Int. Cl.
| | | |
|---|---|---|
| *G05G 1/30* | (2008.04) | |
| *B60T 7/04* | (2006.01) | |
| *B60T 7/06* | (2006.01) | |
| *G05G 1/44* | (2008.04) | |
| *B60T 11/04* | (2006.01) | |
| *G05G 5/18* | (2006.01) | |

(52) U.S. Cl.
 CPC ............... *B60T 7/045* (2013.01); *B60T 7/042* (2013.01); *B60T 7/06* (2013.01); *B60T 11/046* (2013.01); *G05G 1/44* (2013.01); *G05G 5/18* (2013.01)

(58) Field of Classification Search
 CPC .......... B60T 7/045; B60T 7/042; B60T 7/06; B60T 11/046
 See application file for complete search history.

(56) References Cited

U.S. PATENT DOCUMENTS

| | | | | |
|---|---|---|---|---|
| 2,986,046 | A * | 5/1961 | Vigmostad | ............... G05G 5/24 74/531 |
| 3,194,085 | A * | 7/1965 | Kirk | ....................... B60T 7/047 74/540 |
| 3,918,321 | A | 11/1975 | Hybarger | |
| 4,519,270 | A * | 5/1985 | Kawaguchi | ............. B60T 7/045 74/535 |
| 5,211,072 | A * | 5/1993 | Barlas | ..................... B60T 7/047 74/512 |
| 5,533,420 | A * | 7/1996 | Perisho | ................... B60T 7/047 74/501.5 R |
| 2003/0036459 | A1* | 2/2003 | Jeon | ........................ B60T 7/045 477/194 |
| 2006/0070485 | A1* | 4/2006 | Revelis | ................... B60T 7/045 74/540 |

FOREIGN PATENT DOCUMENTS

| | | |
|---|---|---|
| JP | 2009-101767 A | 5/2009 |
| JP | 2011-189907 A | 9/2011 |

* cited by examiner

*Primary Examiner* — Vicky Johnson
(74) *Attorney, Agent, or Firm* — Carrier Blackman & Associates, P.C.; Joseph P. Carrier; Jingli Wang

(57) ABSTRACT

A parking brake device comprises: a brake pedal which is capable of pivoting from an initial position in relation to a dash panel in a determined angle range; a pair of base plates which are fixed to the dash panel, and which sandwich and pivotally support the brake pedal; a ratchet plate in which ratchet teeth are continuously formed, and which pivots together with the brake pedal; a support pin which couples the pair of base plates; and a ratchet pawl which is supported by the support pin in a manner so as to be capable of oscillation, and which meshes with the ratchet plate. The support pin and the ratchet pawl are disposed between attachment points at the dash panel side of the base plates and a center pin of the brake pedal.

8 Claims, 10 Drawing Sheets

PARKING BRAKE DEVICE

TECHNICAL FIELD

The present invention relates to a parking brake device.

BACKGROUND ART

For example, a foot-operated parking brake device in which a brake pedal is composed of left and right pedal plates has been proposed (see Patent Document 1).

CITATION LIST

Patent Literature

{Patent Document 1}
Japanese Patent Application Publication No. 2011-189907

SUMMARY OF INVENTION

Technical Problem

However, in the parking brake device described in Patent Document 1, the brake pedal is provided with a ratchet mechanism composed of a ratchet pawl (pawl portion) meshing with a ratchet plate (teeth portion), a support pin, a stopper plate, and the like. Therefore, in order to place the ratchet mechanism to the brake pedal, the brake pedal must be configured with two plates of a left pedal plate and a right pedal plate, and there has been a possibility that the brake pedal becomes heavy.

An object of the present invention is to provide a parking brake device which can be composed of a lightweight brake pedal.

Solution to Problem

An invention according to a first aspect of the present invention is a parking brake device, which is mounted on a vehicle and includes: a brake lever which is rotatable in a predetermined angle range from an initial position with respect to a vehicle body side; a pair of base plates which are fixed to the vehicle body side and rotatably supports the brake lever via a rotating shaft; a teeth portion which is formed with a plurality of continuous teeth and rotates together with the brake lever; a support pin for connecting the pair of base plates to each other; a pawl portion which is swingably supported by the support pin and meshes with the teeth portion; a brake cable which is configured to include an outer cable and an inner cable, in which one end of the outer cable is attached to the base plate via a cable attachment portion, and one end of the inner cable is supported by the brake lever; and a cable guide which is provided to the brake lever and is wound with the inner cable, wherein the teeth portion and the pawl portion are located below the inner cable in a state where the inner cable is wound around the cable guide, and wherein the pawl portion is located between the rotating shaft and the cable attachment portion.

According to this invention, by placing the support pin and the pawl portion on the base plate, it is not necessary that the brake pedal is composed of a pair of pedal plates as in the prior art. That is, by connecting the pair of base plates to each other via the support pin, and by placing the support pin and the pawl portion between the rotating shaft of the brake lever and a attachment point on the vehicle body side of the base plate, it is possible that the brake pedal is composed of a single brake lever (a piece of plate), thereby reducing the weight of the brake lever.

Further, since the pair of base plates are connected to each other by the support pin, the support pin contributes to the pair of base plates as a reinforcing member. For example, it is possible to increase rigidity in a case where a force in a twisting direction is applied to the base plate when the brake pedal is operated.

Further, since the inner cable does not hit the teeth portion and the pawl portion in the state where the inner cable is wound around the cable guide, it is possible to achieve both a guide function for the inner cable by the cable guide and a placement of the pawl portion (part of the ratchet mechanism) on the base plate.

Furthermore, since the pawl portion is not placed on the brake lever, the cable guide can be independently provided. Therefore, it is possible to reduce the size of the brake lever compared to the prior art, thereby reducing the weight of the brake lever.

An invention according to a second aspect of the present invention is a parking brake device, wherein the pair of base plates have projecting portions projecting from the pair of base plates toward both side surfaces of the brake lever or toward both side surfaces of the teeth portion.

According to this invention, it is possible to prevent the brake lever or the teeth portion from moving in a different direction (direction twisted with respect to the rotating shaft) from a rotational direction around the rotating shaft, thereby improving operability of the brake lever.

An invention according to a third aspect of the present invention is a parking brake device, wherein the projecting portion includes a first projecting portion which is disposed on the outer periphery of the rotating shaft in the base plate, and a second projecting portion which is spaced from the first projecting portion and disposed at an end portion of the base plate.

According to this invention, it is possible to support the teeth portion or the brake lever at two points which are spaced apart from each other. Therefore, it is possible to stably prevent backlash by preventing the brake lever or the teeth portion from being moved in a different direction (direction twisted with respect to the rotating shaft) from the rotational direction around the rotating shaft.

An invention according to a fourth aspect of the present invention is a parking brake device, wherein the rotating shaft is located between the pair of base plates, wherein the teeth portion is rotatably supported on the rotating shaft, and wherein the brake lever is supported by the rotating shaft via the teeth portion.

However, in the conventional case, when supporting the brake lever by a single plate on the rotating shaft, in order to reduce thickness and weight of the brake lever to be supported by the rotating shaft, a machining that increases a support surface on the rotating shaft by cutting and raising an attachment hole to the rotating shaft by burring or the like has been necessary, so that the brake lever is not inclined or twisted with respect to the rotating shaft. According to the invention of claim 4, it is possible to reduce machining cost because it is not necessary to perform operations such as burring on the brake lever, while it is possible to reduce the weight of the brake lever because it is not necessary to increase the thickness of the brake lever more than necessary.

An invention according to a fifth aspect of the present invention is a parking brake device, wherein the brake lever has a clearance in a direction perpendicular to an axial direction of the rotating shaft, and is supported on the teeth portion.

According to this invention, since the brake lever is supported by the rotating shaft via the teeth portion, it is possible to support the brake lever by the rotating shaft even if the brake lever is formed with a thin thickness, thereby reducing the weight of the brake lever.

An invention according to a sixth aspect of the present invention is a parking brake device, wherein the first projecting portions of the pair of base plates clamp only the teeth portion while one of the first projecting portions is inserted through the clearance.

When two plates are clamped together, there is a possibility that the two plates are moved or twisted to each other, however, according to this invention, it is possible to reliably prevent backlash because only a single teeth portion is clamped.

An invention according to a seventh aspect of the present invention is a parking brake device, wherein a thickness at a portion supported on the rotating shaft of the teeth portion is formed to be greater than a thickness in the vicinity of the rotating shaft of the brake lever.

According to this invention, since a thickness at the portion supported on the rotating shaft of the teeth portion is formed to be greater than a thickness in the vicinity of the rotating shaft of the brake lever, burring or the like is not necessary for the teeth portion, thereby reducing machining operations or the like.

An invention according to an eighth aspect of the present invention is a parking brake device, wherein the rotating shaft is located between the pair of base plates, wherein the teeth portion is rotatably supported on the rotating shaft, and wherein the brake lever and the teeth portion respectively include shaft holes which are flush with each other and slide with respect to the rotating shaft.

According to this invention, since both the brake lever and the teeth portion are supported by the rotating shaft, they can be supported with thickness of two members of the brake lever and the teeth portion, thereby supporting the brake lever in a stable manner.

Advantageous Effects of Invention

According to the present invention, it is possible to provide a parking brake device which can be composed of a lightweight brake pedal.

DESCRIPTION OF EMBODIMENTS

Hereinafter, an embodiment of the present invention will be described in detail with reference to FIGS. 1 to 6. Note that, in the present embodiment, a foot-operated parking brake device 1 which is operated by a driver's foot will be described as an example, however, it may be, for example, a lever-type parking brake device which is provided in an instrument panel of a vehicle and is operated by a driver's hand.

Figure 1:
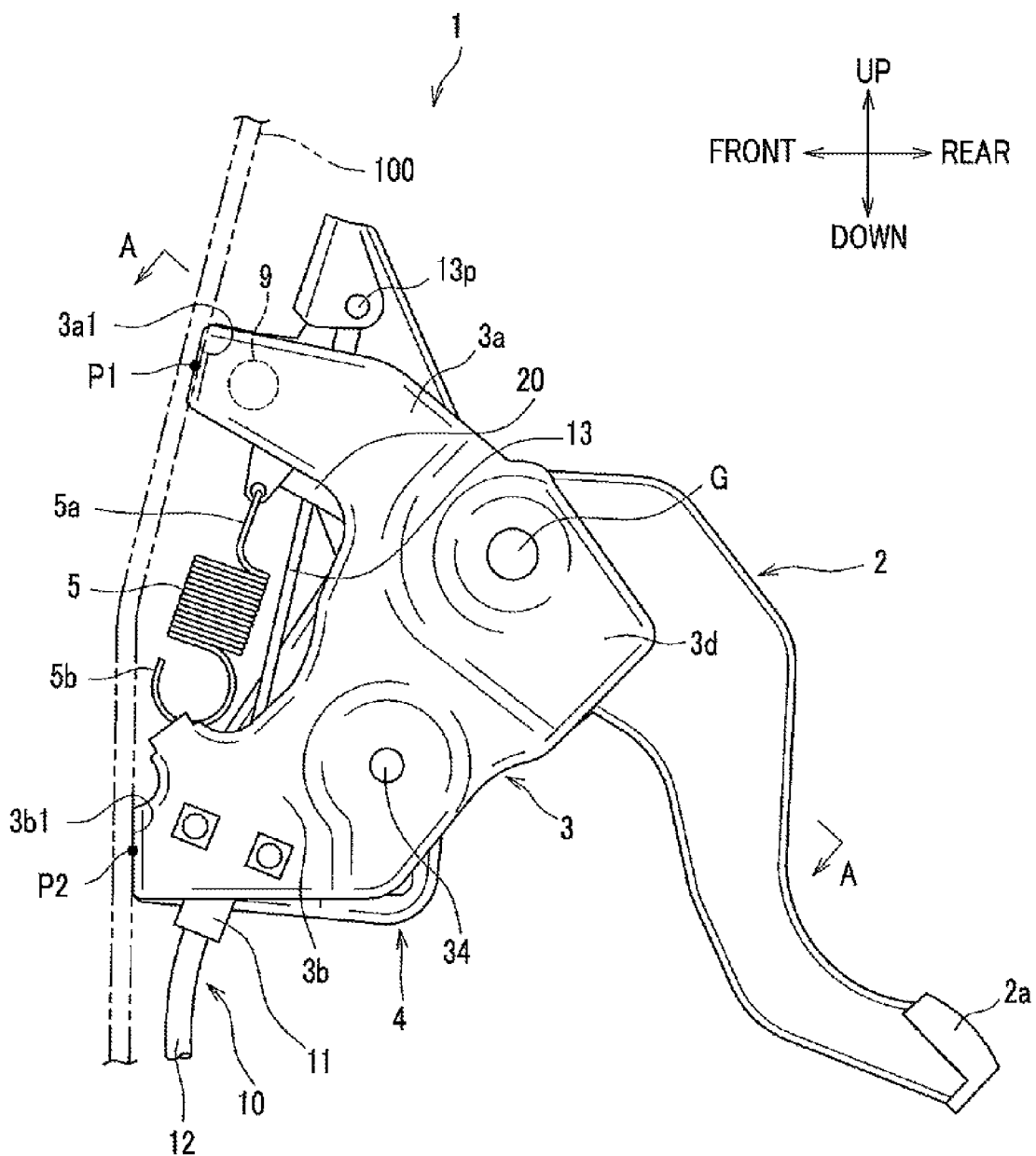
FIG. 1 is a left side view showing a parking brake device according to an embodiment of the present invention.
Figure 2:
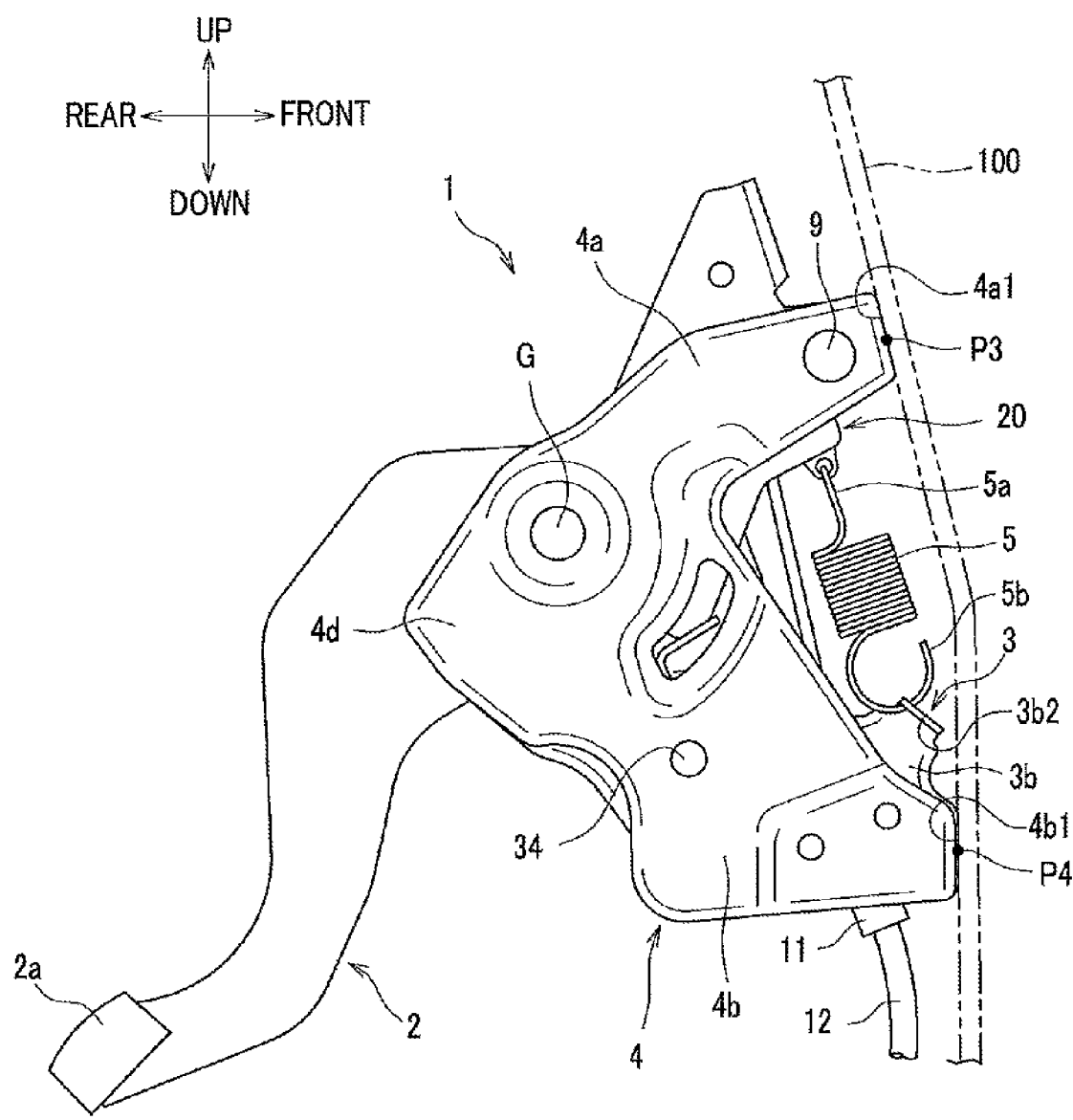
FIG. 2 is a right side view showing the parking brake device according to the embodiment of the present invention.

FIG. 1 is a left side view showing a parking brake device according to the present embodiment, and FIG. 2 is a right side view showing the parking brake device according to the present embodiment. Note that, in FIG. 1, a front side in a direction perpendicular to a sheet is a left side in a vehicle width direction, and in FIG. 2, a front side in a direction perpendicular to a sheet is a right side in a vehicle width direction. Further, in FIGS. 1 and 2 (FIGS. 3 and 4 as well), a dash panel 100 side is a front side of the vehicle. Note that, the dash panel 100 is, for example, located in front of a driver's seat, and is a part constituting a vehicle body, which partitions a vehicle compartment space and a power plant accommodating space (driving source accommodating space) in which an engine, a motor, or the like is mounted.

As shown in FIGS. 1 and 2, the parking brake device 1 is disposed at the foot of the driver's seat, and is configured to include a brake pedal 2 (brake lever), a left base plate 3, a right base plate 4 (sometimes collectively referred to as a pair of base plates 3, 4), a return spring 5, and the like. Note that, FIGS. 1 and 2 (FIGS. 3 and 4 as well) show when the brake pedal 2 is in an initial state (when the brake pedal 2 is not depressed, and a braking force is not generated).

The brake pedal 2 is adapted to be depressed by the driver's foot, and is formed to be elongated from a rear lower side toward a front upper side so as to be substantially W-shaped in a side view by press molding of a single steel plate. That is, the brake pedal 2 in the present embodiment is not a combination of two plates, but is made of a single plate.

Further, the brake pedal 2 is rotatably supported by the pair of base plates 3, 4 via a center pin G (rotating shaft), and in the initial state, one end (a lower end) thereof is located at the most rear side, and the other end (an upper end) thereof is located at the most front side (dash panel 100 side). Furthermore, the lower end of the brake pedal 2 is, for example, provided with a rubber pedal pad 2a.

The pair of base plates 3, 4 are, for example, formed by press molding of steel plates, and are disposed on the left and right sides of the brake pedal 2. Further, as shown in FIG. 1, the left base plate 3 is formed with a plate portion 3a and a plate portion 3b so as to be in a substantial V-shape in a side view. As a reference of the center pin G, the plate portion 3a extends obliquely upward toward the dash panel 100 (in a direction along the brake pedal 2), and the plate portion 3b extends obliquely downward toward the dash panel 100 (in a direction substantially perpendicular to the brake pedal 2) and is formed wider than the plate portion 3*a*.

Further, as shown in FIG. 2, the right base plate 4 is formed with a plate portion 4*a* and a plate portion 4*b* so as to be in a substantial V-shape in a side view. As a reference of the center pin G, the plate portion 4*a* extends obliquely upward toward the dash panel 100 (in the direction along the brake pedal 2), and the plate portion 4*b* extends obliquely downward toward the dash panel 100 (in the direction substantially perpendicular to the brake pedal 2) and is formed wider than the plate portion 4*a*. Note that, the left base plate 3 and the right base plate 4 are configured to have substantially the same shape in a side view.

Further, as shown in FIG. 1, the left base plate 3 is fastened to the dash panel 100 via bolts or the like at a front end 3*a*1 of the plate portion 3*a* and a front end 3*b*1 of the plate portion 3*b*. Further, as shown in FIG. 2, the right base plate 4 is fastened to the dash panel 100 via bolts or the like at a front end 4*a*1 of the plate portion 4*a* and a front end 4*b*1 of the plate portion 4*b*. In particular, the front ends 3*a*1, 3*b*1, 4*a*1, 4*b*1 are respectively formed to be bent in a direction along the dash panel 100, and the bent formed front end portions are fastened to the dash panel 100 via the bolts or the like. Note that, in the present embodiment, points P1, P2 (see FIG. 1) and points P3, p4 (see FIG. 2), where the front ends 3*a*1, 3*b*1, 4*a*1, 4*b*1 of the pair of base plates 3, 4 and the dash panel 100 are fastened to each other, correspond to vehicle body side attachment points of the base plates 3, 4.

The return spring 5 is, for example, made of a coil-shaped one, and one end 5*a* thereof is hooked to a cable guide 20 to be described later, while the other end 5*b* thereof is hooked to a hole (not shown) of a plate portion 3*b*2 (see FIG. 2) which is formed integrally with the plate portion 3*b* of the left base plate 3. By elastic restoring force of the return spring 5, an urging force in a return direction (clockwise direction in FIG. 2) is always applied to the brake pedal 2.

Figure 3:
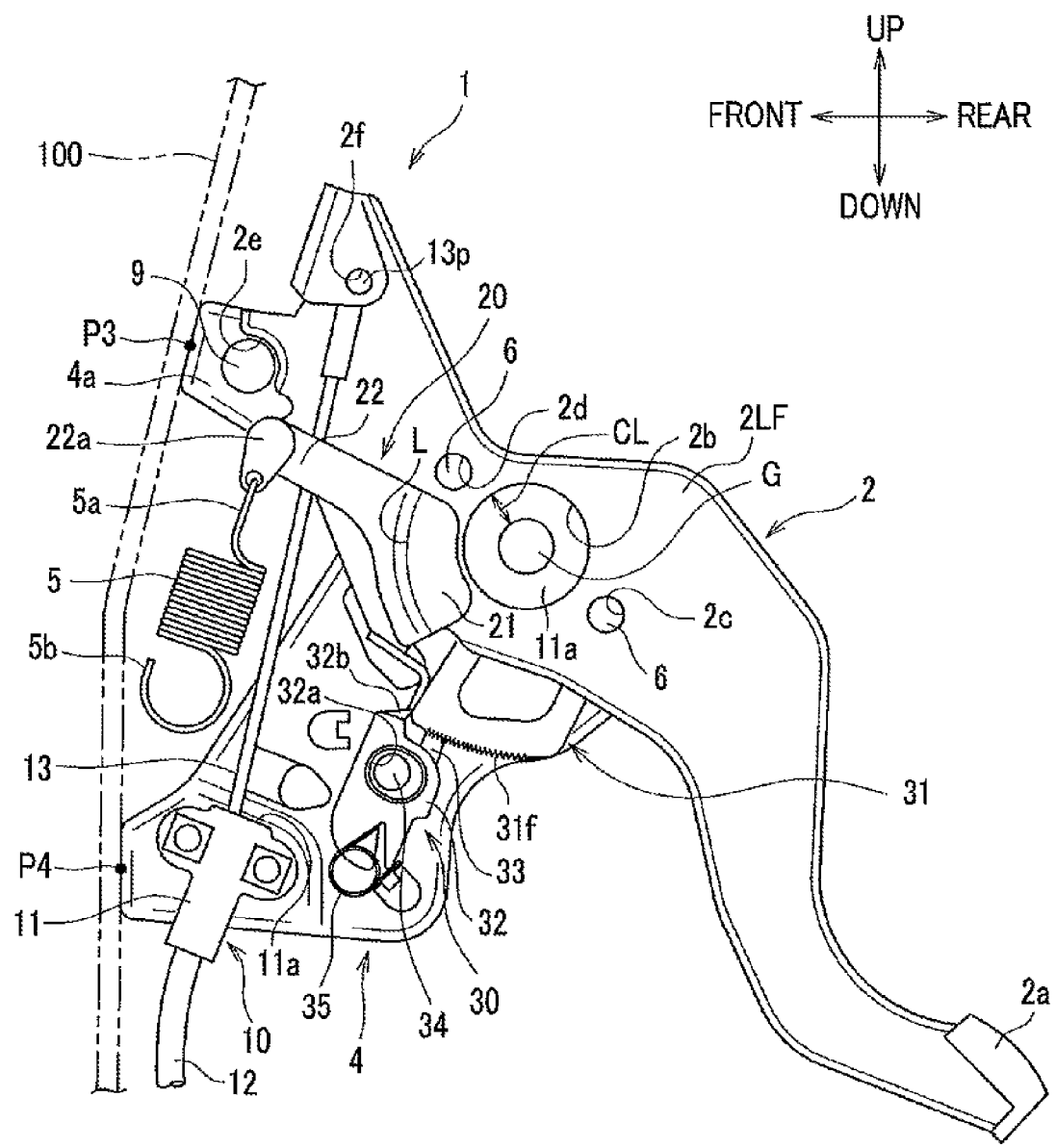
FIG. 3 is a left side view of a state of removing a left side base plate of the parking brake device according to the embodiment of the present invention.
Figure 4:
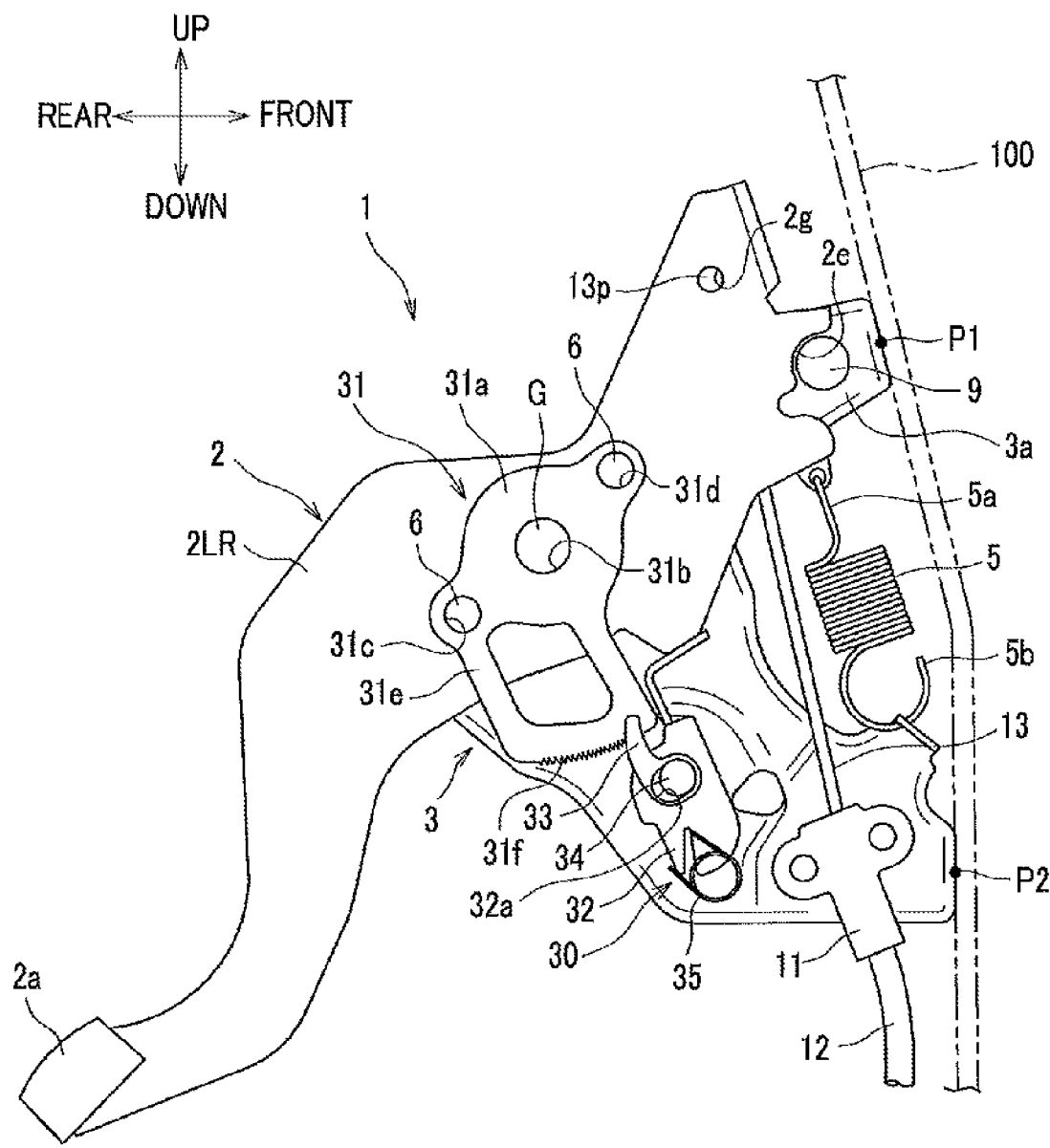
FIG. 4 is a right side view of a state of removing a right side base plate of the parking brake device according to the embodiment of the present invention.

FIG. 3 is a left side view of a state of removing a left side base plate of the parking brake device according to the present embodiment, and FIG. 4 is a right side view of a state of removing a right side base plate of the parking brake device according to the present embodiment.

As shown in FIG. 3, in the brake pedal 2, a concentric circular through-hole 2*b* with a diameter greater than a diameter of the center pin G is formed around the center pin G. Further, in the brake pedal 2, a connecting hole 2*c* having a diameter smaller than that of the through-hole 2*b* is formed on one side (the pedal pad 2*a* side) with respect to the through-hole 2*b*, and a connecting hole 2*d* is formed on the other side with respect to the through-hole 2*b*. Note that, FIG. 3 is a state of removing the left base plate 3, and shows a state in which an annular clearance CL is formed between the through-hole 2*b* and a periphery of the center pin G of the brake pedal 2, and further shows a state in which connecting pins 6, 6 to be described later are inserted into the connecting holes 2*c*, 2*d*.

Further, an upper front end of the brake pedal 2 is formed with an arcuate contact portion 2*e* which is in contact with a peripheral surface of a regulating pin 9 firmly fixed to the right base plate 4. The regulating pin 9 has a function of stopping the brake pedal 2 at an initial position thereof when the brake pedal 2 rotates back in a counterclockwise direction in FIG. 3 by the elastic restoring force of the return spring 5, and is firmly fixed between the plate portion 4*a* of the right base plate 4 shown in FIG. 3 and the plate portion 3*a* (see FIG. 4) of the left base plate 3 shown in FIG. 4. Note that, the regulating pin 9 is located in the vicinity of the dash panel 100 (the vicinity of the points P1, P3), and is adapted to come into contact with the brake pedal 2 at a position away from the center pin G of the brake pedal 2.

Further, as shown in FIG. 3, the parking brake device 1 includes a brake cable 10, a cable guide 20, and a ratchet mechanism 30.

The brake cable 10 is configured to include a cable attachment portion 11, an outer cable 12, and an inner cable 13.

The cable attachment portion 11 is one to fix an end portion (one end) of the outer cable 12, and is, for example, fixed between the plate portion 3*b* (see FIG. 1) of the left base plate 3 and the plate portion 4*b* of the right base plate 4 by means of screws (not shown). Further, the cable attachment portion 11 is substantially T-shaped in a side view, and an opening 11*a* through which the inner cable 13 is pulled out is disposed to face substantially upward.

For example, the outer cable 12 extends to the vicinity of brake devices (not shown, drum brakes or disc brakes) of left and right rear wheels, while enclosing the inner cable 13.

An end portion (One end) of the inner cable 13 is pivotally connected to an upper end of the brake pedal 2 via a pivot pin 13*p*. Note that, the upper end portion of the brake pedal 2 is, for example, partially folded to form plate-like portions facing each other, and the pivot pin 13 *p* is inserted into a hole 2*f* (see FIG. 3) and a hole 2*g* (see FIG. 4) which are formed in the plate-like facing portions, so as to connectively support the inner cable 13 in a rotatable manner.

Note that, although not shown, the other end of the inner cable 13 is connected to the brake devices (not shown) of the left and right rear wheels via an equalizer mechanism. By depressing the brake pedal 2 to pull the inner cable 13, the brake devices (not shown) are adapted to exert braking forces in a different system from a foot brake system.

The brake guide 20 is adapted to vary a lever ratio to be described later, and is fixed to a left side surface 2LF of the brake pedal 2. The cable guide 20 includes a substantially arcuate winding portion 21 which is wound with the inner cable 13 when the brake pedal 2 is depressed, and a guide portion 22 for guiding the inner cable 13 to the winding portion 21.

Note that, the cable guide 20 is, for example, composed of two plate members, to be formed by bonding both ends of the two plate members to each other, and is formed with a space (not shown) for guiding the inner cable 13 in a front-rear direction between the both ends thereof. Further, the cable guide 20 is configured such that the inner cable 13 is arcuately wound along a line indicated by a code L in FIG. 3.

The winding portion 21 shows substantially fan shape in a side view, and is disposed so as to be along a circumferential direction of the through-hole 2*b* in the vicinity in front of the through-hole 2*b*. The guide portion 22 extends obliquely upward and forward so as to be away from the center pin G at an upper end of an outer peripheral edge of the winding portion 21, and is configured such that a tip end thereof is located on the dash panel 100 side relative to the inner cable 13 at the initial position of the brake pedal 2. Further, the one end 5*a* of the return spring 5 described above is hooked to a tip end 22*a* of the guide portion 22.

In this manner, in the parking brake device 1 according to the present embodiment, by depressing the brake pedal 2, the inner cable 13 is moved rearward along the guide portion 22, to be in contact with the winding portion 21. With this configuration, the ratio (lever ratio) varies between before and after the inner cable 13 comes into contact with the winding portion 21 (variable ratio). Note that, that the ratio varies means that a relationship between a pulling amount of the inner cable 13 and a stroke amount during depression of the brake pedal 2 varies.

As shown in FIGS. 3 and 4, the ratchet mechanism 30 has a function of holding the brake pedal 2 at the angle when depressed by the driver, and is composed of a ratchet plate 31 (teeth portion), a ratchet pawl 32 (pawl portion), a stopper plate 33, a support pin 34, a turnover spring 35, and the like.

As shown in FIG. 4, the ratchet plate 31 is fixed to a right side surface 2LR of the brake pedal 2. That is, the ratchet plate 31 includes a fixed portion 31a fixed to the brake pedal 2, and a ratchet teeth 31f formed with a plurality of continuous teeth meshing with the ratchet pawl 32. The ratchet teeth 31f are located below the center pin G in the vertical direction (up-down direction).

The fixed portion 31a is formed with a shaft hole 31b through which the center pin G is inserted, and connecting holes 31c, 31d are formed at positions corresponding to the connecting holes 2c, 2d (see FIG. 3). Further, the fixed portion 31a has an extending portion 31e having a substantial U-shape in a side view, and a lower end outer edge portion of the extending portion 31e is formed with the ratchet teeth 31f. The ratchet teeth 31f of the ratchet plate 31 is formed so as to have an arc shape around the center pin G, and is adapted to rotate with a rotation operation of the brake pedal 2 when the brake pedal 2 is depressed.

The ratchet pawl 32 is swingably supported between the pair of base plates 3, 4 via the support pin 34. That is, the ratchet pawl 32 is formed with a long-hole 32a, and by inserting the support pin 34 with a play into the long-hole 32a, the ratchet pawl 32 is swingably supported by the support pin 34. Further, the ratchet pawl 32 has a pawl 32b (see FIG. 3) meshing with the ratchet teeth 31f of the ratchet plate 31. Furthermore, the ratchet pawl 32 is located between (substantially between) the cable attachment portion 11 and the ratchet plate 31 in the vertical direction (up-down direction).

The stopper plate 33 is fixed to the ratchet pawl 32, and is configured to swing together with the ratchet pawl 32, so that a swing fulcrum of the ratchet pawl 32 is changed in response to a depression state of the brake pedal 2.

The support pin 34 is supported by shaft holes (not shown) formed in the pair of base plates 3, 4, and thus connects between the pair of base plates 3, 4.

The turnover spring 35 is, for example, hung over both the right base plate 4 and the ratchet pawl 32.

The ratchet pawl 32 and the support pin 34 are disposed between the center pin G of the brake pedal 2 and the attachment points P1, P2 (P3, P4) to the dash panel 100 of the base plate 3 (4). In other words, the ratchet pawl 32 and the support pin 34 are located between the center pin G and the attachment points P1, P2 (P3, P4) in the front-rear direction of the vehicle.

When the driver depresses the brake pedal 2 during stopping (parking) of the vehicle, the ratchet pawl 32 urged by the turnover spring 35 is engaged with the ratchet teeth 31f of the ratchet plate 31, so that return of the brake pedal 2 is prevented. At this time, the stopper plate 33 is moved downward with respect to the support pin 34, so that the turnover spring 35 is inverted to urge the ratchet pawl 32 in an opening direction. On the other hand, when the driver depresses the brake pedal 2 again during starting of the vehicle, the ratchet pawl 32 urged by the turnover spring 35 is separated from the ratchet plate 31, and when the driver releases the depression force, the brake pedal 2 urged by the return spring 5 is rotated toward the initial state. When the brake pedal 2 is returned to the initial state, the stopper plate 33 (i.e., the ratchet pawl 32) is rotated by a collision with a projecting piece formed on the brake pedal 2, and the turnover spring 35 is inverted again, to urge the ratchet pawl 32 in the engagement direction (for example, see Japanese Patent Application Publication 2011-189907).

Figure 5:
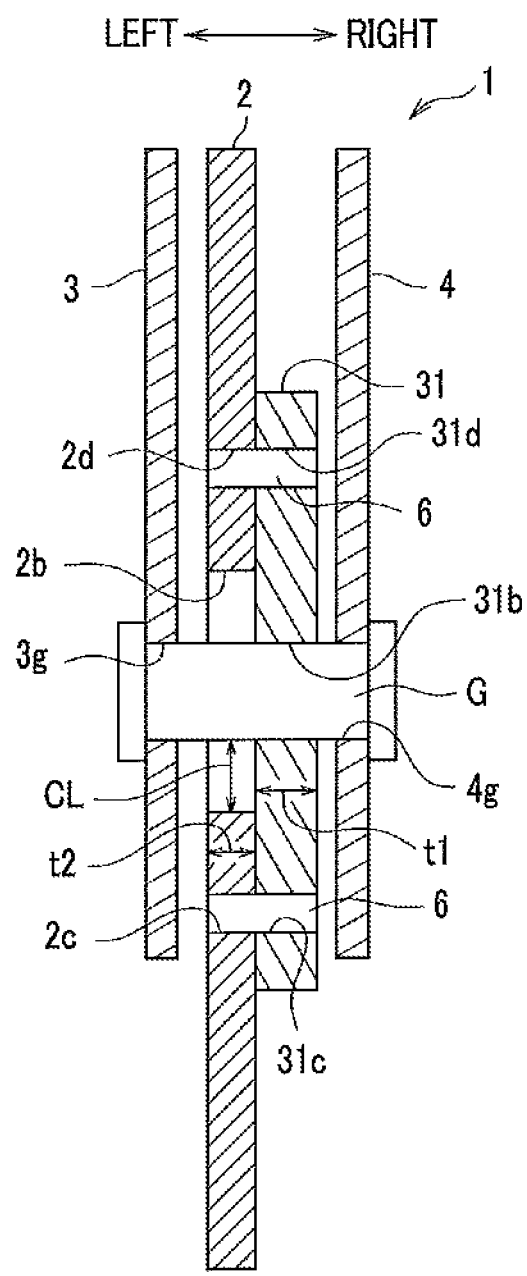
FIG. 5 is a schematic cross-sectional view taken along a line A-A in FIG. 1.

FIG. 5 is a schematic cross-sectional view taken along a line A-A in FIG. 1. Note that, the cross-sectional view shown in FIG. 5 shows a simplified cross-sectional shape of the brake pedal 2 and the pair of base plates 3, 4.

As shown in FIG. 5, the connecting holes 2c, 2d of the brake pedal 2 and the connecting holes 31c, 31d of the ratchet plate 31 are respectively connected to each other via the connecting pins 6. Further, the center pin G is slidably inserted into the shaft hole 31b formed in the ratchet plate 31, and the center pin G is supported by the pair of base plates 3, 4. Note that, the center pin G is inserted into a shaft hole 3g formed in the left base plate 3 and a shaft hole 4g formed in the right base plate 4, and is firmly fixed to the pair of the base plates 3, 4 at both ends of the center pin G.

In this manner, the parking brake device 1 according to the present embodiment is configured such that the brake pedal 2 is not directly rotatably supported by the pair of the base plates 3, 4, but is rotatably supported by the center pin G via the ratchet plate 31.

As a result, by increasing a thickness t1 of a portion supported on the center pin G of the ratchet plate 31 to be greater than a thickness t2 in the vicinity of the center pin G of the brake pedal 2 (t1>t2), burring or the like is not necessary for the ratchet plate 31, thereby reducing machining operations or the like.

In addition, although not shown, the brake pedal 2 may be provided with a parking brake sensor for detecting that the brake pedal 2 is depressed. The parking brake sensor can, for example, turn on a parking indicator (lamp) provided in meters and gauges, by depressing the brake pedal 2 to turn on the sensor (switch).

Next, an operation of the parking brake device 1 according to the present embodiment will be described with reference to FIG. 6. Note that, FIG. 6 shows a state where the left base plate 3 is removed, and a state after rotation of the ratchet mechanism 30 of the brake pedal 2 and a state after rotation of the return spring 5 are not shown.

Figure 6:
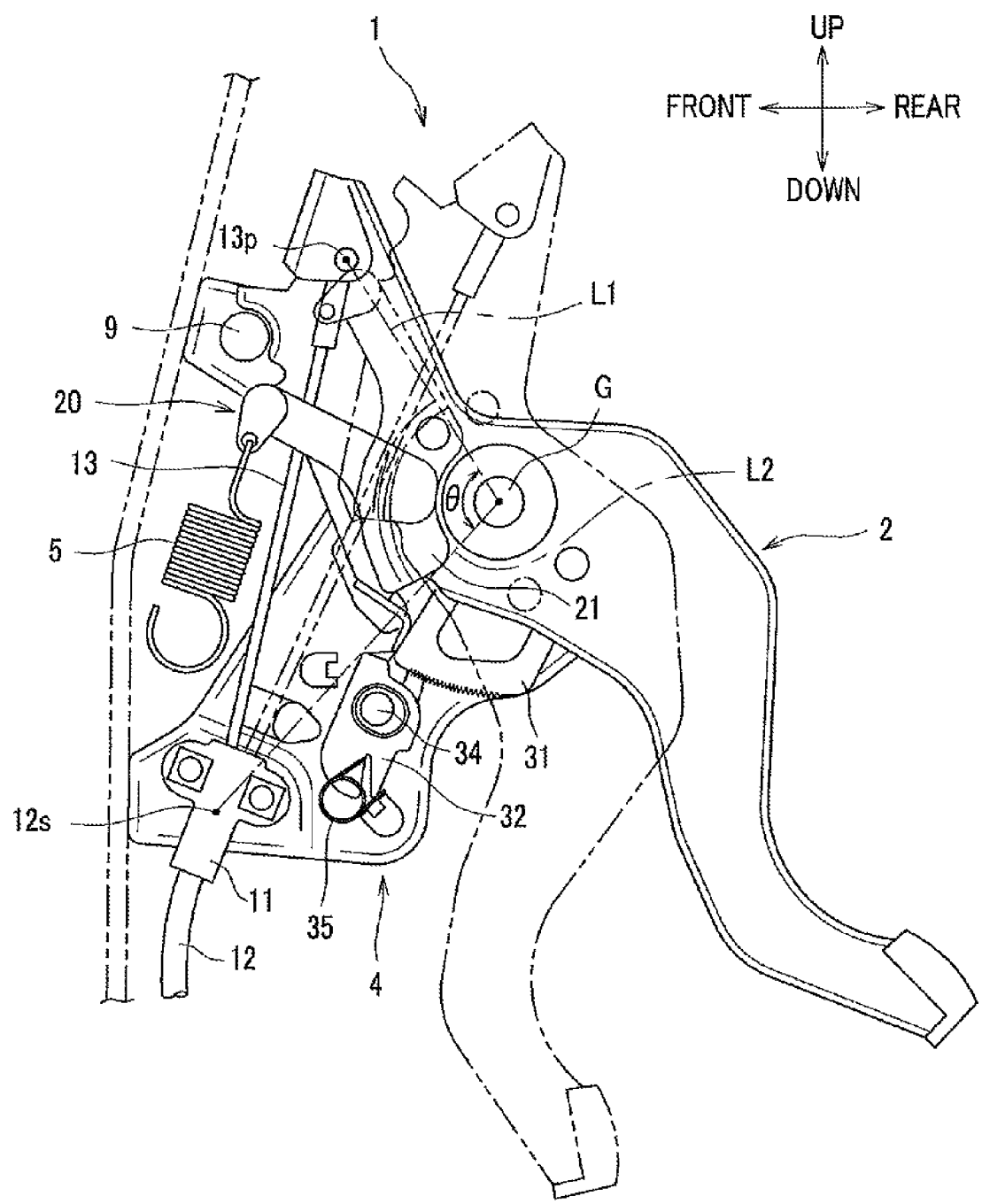
FIG. 6 is an operation explanatory view of the parking brake device.

When the driver depresses the brake pedal 2 from the initial state after parking a car (vehicle), as shown in FIG. 6, the brake pedal 2 is rotated in the clockwise direction around the center pin G, and the pivot pin 13p is rotated, and thus the inner cable 13 is swung rearward while being pulled out from the outer cable 12. In this case, an angle (a crossing angle) θ formed by a line L1 connecting the center pin G and the pivot pin 13p, and a line connecting the center pin G and one end 12s of the outer cable 12 is an obtuse angle at the initial stage, and is increased in response to depression of the brake pedal 2, and thus a lever ratio (a ratio of a depression amount of the brake pedal 2 to a pulled-out amount of the inner cable 13) is gradually increased.

Then, when the driver further depresses the brake pedal 2, as shown by two-dot chain lines in FIG. 6, the inner cable 13 comes into contact with the winding portion 21 of the cable guide 20, and is then wound around the winding portion 21 of the cable guide 20. In the present embodiment, the lever ratio increases until the inner cable 13 comes into contact with the winding portion 21 of the cable guide 20, but starts to gradually decrease from the time (winding start point P) when the inner cable 13 starts to be wound around the winding portion 21 of the cable guide 20.

In this manner, in an early stage of depression of the brake pedal 2, operability is improved because the pulled-out amount of the inner cable 13 is increased. Further, in a middle stage of depression of the brake pedal 2, a sufficient parking brake force is ensured because the pulled-out amount of the inner cable 13 is decreased (that is, because the tensile force is increased). Then, in a last stage of depression of the brake pedal 2, reliable parking brake is achieved because the pulled-out amount of the inner cable 13 is increased (because increase of the lever ratio is suppressed) as compared to the middle stage of depression.

As described above, the parking brake device 1 according to the present embodiment includes: the brake pedal 2 which is rotatable in a predetermined angle range from an initial position with respect to the dash panel 100; the pair of base plates 3, 4 which are fixed to the dash panel 100 and rotatably supports the brake pedal 2; the ratchet plate 31 which is formed with the ratchet teeth 31f and rotates together with the brake pedal 2; the support pin 34 for connecting the pair of base plates 3, 4 to each other; and the ratchet pawl 32 (pawl 32b) which is swingably supported by the support pin 34 and meshes with the ratchet plate 31 (ratchet teeth 31o, wherein the support pin 34 and the ratchet pawl 32 are arranged to be located between the center pin G (rotating shaft) of the brake pedal 2 and the attachment points P1, P2, P3, P4 (vehicle body side attachment points) to the dash panel 100 of the pair of base plates 3, 4.

In this manner, by placing the support pin 34 and the ratchet pawl 32 on the pair of base plates 3, 4, it is not necessary to provide a pair of pedal plates as in the prior art. That is, by connecting the pair of base plates 3, 4 to each other via the support pin 34, and by placing the support pin 34 and the ratchet pawl 32 between the center pin G of the brake pedal 2 and the attachment points P1, P2, P3, P4 to the dash panel 100 of the pair of base plates 3, 4 in the front-rear direction of the vehicle, it is possible to employ the brake pedal 2 which is formed by press molding of a single steel plate, thereby reducing the weight of the brake pedal 2.

Further, since the ratchet pawl 32 is disposed not on the brake pedal 2 but on the base plate 3 (4), it is possible to reduce the weight of the brake pedal 2 also in this respect. In this manner, it is possible to reduce the weight of the brake pedal 2 in a state where a variable ratio mechanism can be used.

Further, by connecting the pair of base plates 3, 4 to each other via the support pins 34, the support pin 34 contributes to the pair of base plates 3, 4 as a reinforcing member, and it is possible to increase rigidity in a case where a force in a twisting direction is applied to the pair of base plates 3, 4 during depression of the brake pedal 2.

Further, the parking brake device 1 according to the present embodiment includes: the brake cable 10, in which one end 12s (see FIG. 6) of the outer cable 12 is attached to the pair of base plates 3, 4 via the cable attachment portion 11, and one end of the inner cable 13 is supported by the brake pedal 2; and the cable guide 20 which is provided to the brake pedal 2 and is wound with the inner cable 13, wherein the ratchet plate 31 and the ratchet pawl 32 are located below the inner cable 13 in a state where the inner cable 13 is wound around the cable guide 20 (winding portion 21), and wherein the ratchet pawl 32 is located between the center pin G of the brake pedal 2 and the cable attachment portion 11 in the front-rear direction of the vehicle. Note that, to be located below the inner cable 13 means that when the inner cable 13 is wound around the cable guide 20, the ratchet plate 31 and the ratchet pawl 32 are located below a portion wound around the cable guide 20 of the inner cable 13 in the vertical direction (up-down direction).

As a result, since the inner cable 13 does not contact the ratchet plate 31 and the ratchet pawl 32 even if the inner cable 13 is wound around the cable guide 20, it is possible to achieve both a guide function for the inner cable 13 by the cable guide 20 and a placement of the ratchet pawl 32 on the pair of base plates 3, 4.

Further, since the ratchet pawl 32 is not placed on the brake pedal 2, the cable guide 20 can be provided independently, and thus it is possible to reduce the size of the brake pedal 2 than the prior art, thereby reducing the weight of the brake pedal 2.

Meanwhile, in a case where the brake pedal 2 made of a single plate is supported by the center pin G, when reducing the plate thickness of the brake pedal 2 to reduce the weight thereof, there may occur a problem that the brake pedal 2 is inclined or twisted with respect to the center pin G (rotating shaft) when the brake pedal 2 is supported by the center pin G. In order to prevent such a problem, a machining that increases a support surface on the center pin G by cutting and raising an attachment hole to the center pin G by burring or the like has been necessary.

Therefore, in the present embodiment, the center pin G is placed between the pair of base plates 3, 4, and the ratchet plate 31 is rotatably supported on the center pin G, and further the brake pedal 2 is supported by the center pin G via the ratchet plate 31, and thus it is possible to reduce machining cost because it is not necessary to perform operations such as burring on the brake pedal 2, and further it is possible to reduce the weight of the brake pedal 2 because it is not necessary to increase the thickness of the brake pedal 2 more than necessary.

Further, in the present embodiment, since the brake pedal 2 is supported by the ratchet plate 31 by forming the clearance CL in the brake pedal 2 in a direction (radial direction) perpendicular to an axial direction of the center pin G, the brake pedal 2 is supported by the center pin G via the ratchet plate 31, and thus it is possible to support the brake pedal 2 by the center pin G even if the brake pedal 2 is constructed with a thin wall thickness, thereby reducing the weight of the brake pedal 2.

Meanwhile, when both the brake pedal 2 and the ratchet plate 31 are configured to be supported on the center pin G, accuracy of both the shaft hole formed in the brake pedal 2 and the shaft hole 31b of the ratchet plate 31 is required, however, since only the ratchet plate 31 is supported on the center pin G, the accuracy is not required.

Further, in the present embodiment, by forming the thickness t1 (see FIG. 5) at the portion supported on the center pin G of the ratchet plate 31 to be greater than the thickness t2 (see FIG. 5) in the vicinity of the center pin G of the brake pedal 2, burring or the like is not necessary for the ratchet plate 31, thereby reducing machining operations or the like.

Modified Example

Figure 7:
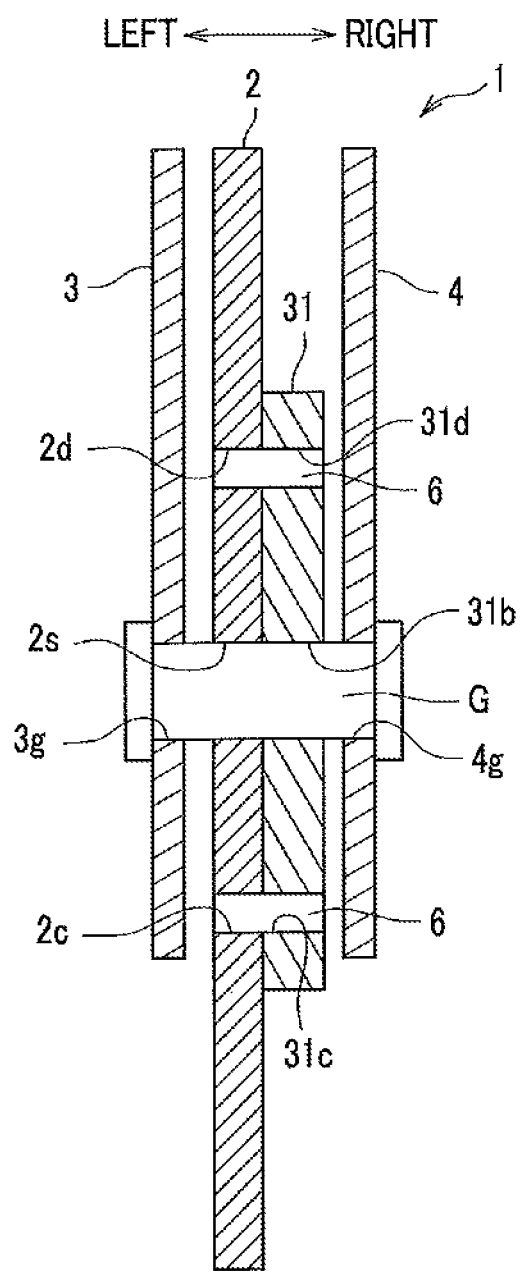
FIG. 7 is a schematic cross-sectional view showing a parking brake device according to a modified example of the embodiment of the present invention.

FIG. 7 is a schematic cross-sectional view showing a parking brake device according to a modified example of the present embodiment. Note that, as with FIG. 5, FIG. 7 also shows a simplified cross-sectional shape of the brake pedal 2 and the pair of base plates 3, 4.

As shown in FIG. 7, the brake pedal 2 is formed with a shaft hole 2s to be pivotally supported on the center pin G. The ratchet plate 31 is formed with the shaft hole 31b to be pivotally supported on the center pin G. Further, the shaft hole 2s and the shaft hole 31b respectively slide with respect to the center pin G and are flush with each other, and it is configured such that both the brake pedal 2 and the ratchet plate 31 are supported on the center pin G.

As a result, since both the brake pedal 2 and the ratchet plate 31 are supported on the center pin G, it is possible to support the brake pedal 2 in a stable manner by two thicknesses of the brake pedal 2 and the ratchet plate 31, thereby stably supporting the brake pedal 2.

Another Embodiment

Figure 8:
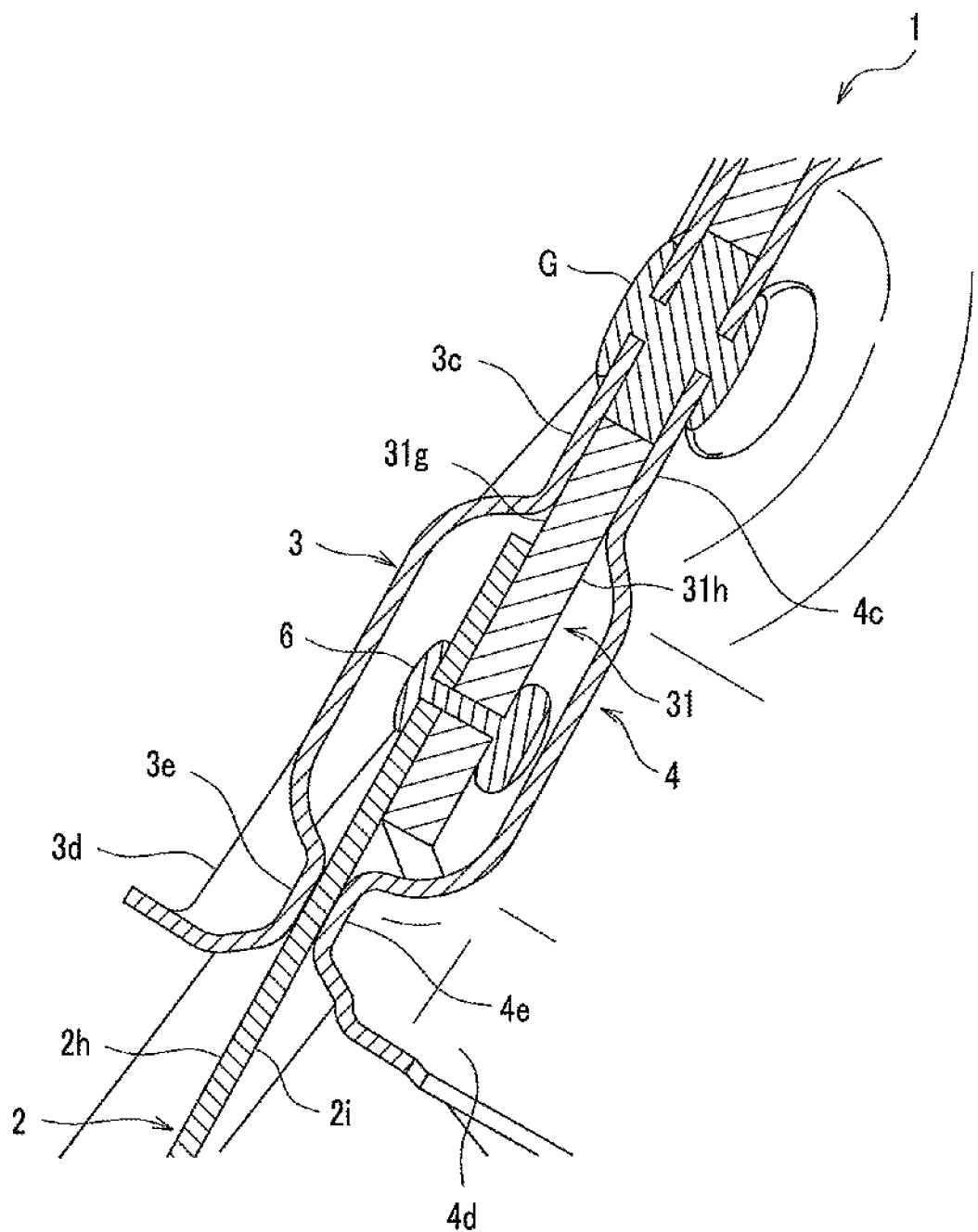
FIG. 8 is a perspective cross-sectional view showing a main part of a parking brake device according to another embodiment of the present invention.
Figure 9:
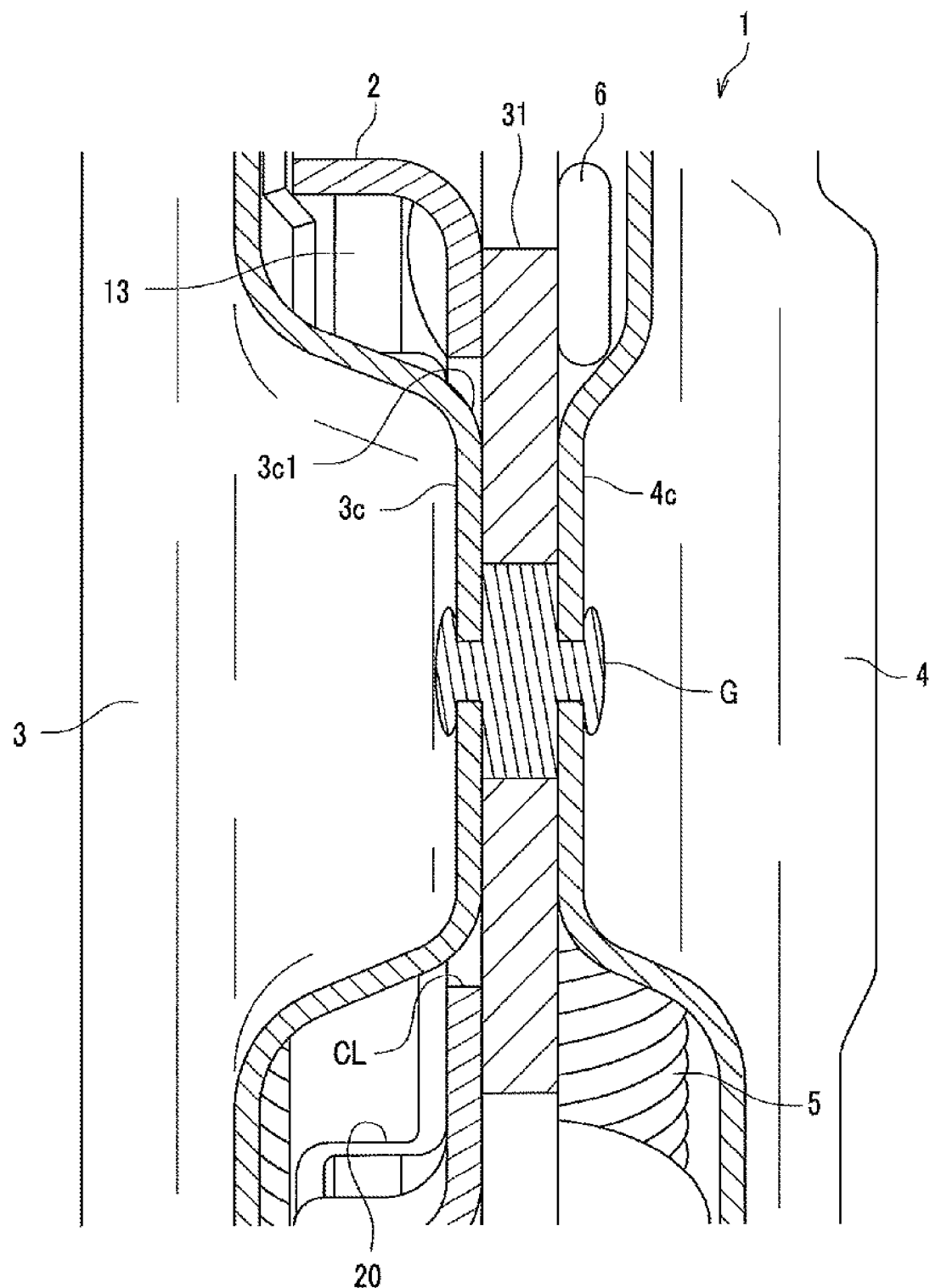
FIG. 9 is a cross-sectional view showing a support structure of a brake pedal in the other embodiment of the present invention.

FIG. 8 is a perspective cross-sectional view showing a main part of a parking brake device according to another embodiment, and FIG. 9 is a cross-sectional view showing a support structure of a brake pedal in the other embodiment. Note that, FIG. 8 shows the perspective cross-sectional view when the pair of base plates 3, 4 are cut in a straight line so as to pass through the connecting pin 6 on the pedal pad 2a side of the brake pedal 2 and the center pin G (rotating shaft) in FIG. 4. Further, FIG. 8 shows a configuration in which the brake pedal 2 is supported by the center pin G via the ratchet plate 31.

As shown in FIG. 8, the base plate 3 is formed with a first projecting portion 3c projecting toward a side surface 31g of the ratchet plate 31 at the outer periphery of the center pin G. Similarly, the base plate 4 is formed with a first projecting portion 4c projecting toward a side surface 31h of the ratchet plate 31 at the outer periphery of the center pin G. The first projecting portions 3c, 4c are formed in a concave shape so as to show a substantially truncated conical shape which is reduced in diameter toward the side surfaces 31g, 31h.

Further, the base plate 3 is formed with a second projecting portion 3e projecting toward a side surface 2h of the brake pedal 2 at an end portion 3d of the base plate 3 spaced apart from the first projecting portion 3c. Similarly, the base plate 4 is formed with a second projecting portion 4e projecting toward a side surface 2i of the brake pedal 2 at an end portion 4d of the base plate 4 spaced apart from the first projecting portion 4c.

Further, as shown in FIG. 9, the first projecting portion 3c is configured such that a tip portion 3c1 thereof has a diameter which is inserted into the clearance CL formed in the brake pedal 2. Note that, the clearance CL has, for example, a circular shape as shown in FIG. 3. Then, the ratchet plate 31 is configured to be clamped between the first projecting portion 3c and the first projecting portion 4c.

In this manner, by providing the first projecting portions 3c, 4c and the second projecting portions 3e, 4e (see FIG. 8), it is possible to prevent the ratchet plate 31 from being inclined (moved) in a different direction from the rotational direction around the center pin G, that is, in a direction twisted with respect to the center pin G, thereby improving the operability of the brake pedal 2.

Further, by providing the first projecting portions 3c, 4c and the second projecting portions 3e, 4e (see FIG. 8), it is possible to support the ratchet plate 31 and the brake pedal 2 connected to the ratchet plate 31 at two points which are spaced apart from each other, thereby stably preventing backlash by preventing the brake lever 2 and the ratchet plate 31 from being inclined (moved) in the different direction from the rotational direction around the center pin G, that is, in the direction twisted with respect to the center pin G.

Meanwhile, when the two plates (brake pedal 2, ratchet plate 31) are clamped by the first projecting portions 3c, 4c, there is a possibility that the two plates are moved or twisted to each other. Therefore, by clamping only the ratchet plate 31 between the first projecting portion 3c and the first projecting portion 4c while the first projecting portion 3c is inserted into the clearance CL (see FIG. 9), it is possible to reliably prevent backlash of the brake pedal 2.

Note that, in the embodiment shown in FIG. 8, a case in which the first projecting portions 3c, 4c are formed in a concave shape at an entire outer periphery (peripheral edge portion) of the center pin G including the center pin G has been described as an example, however, it is not limited thereto, but may be configured such that annular first projecting portions are formed on only the outer periphery of the center pin G.

Figure 10:
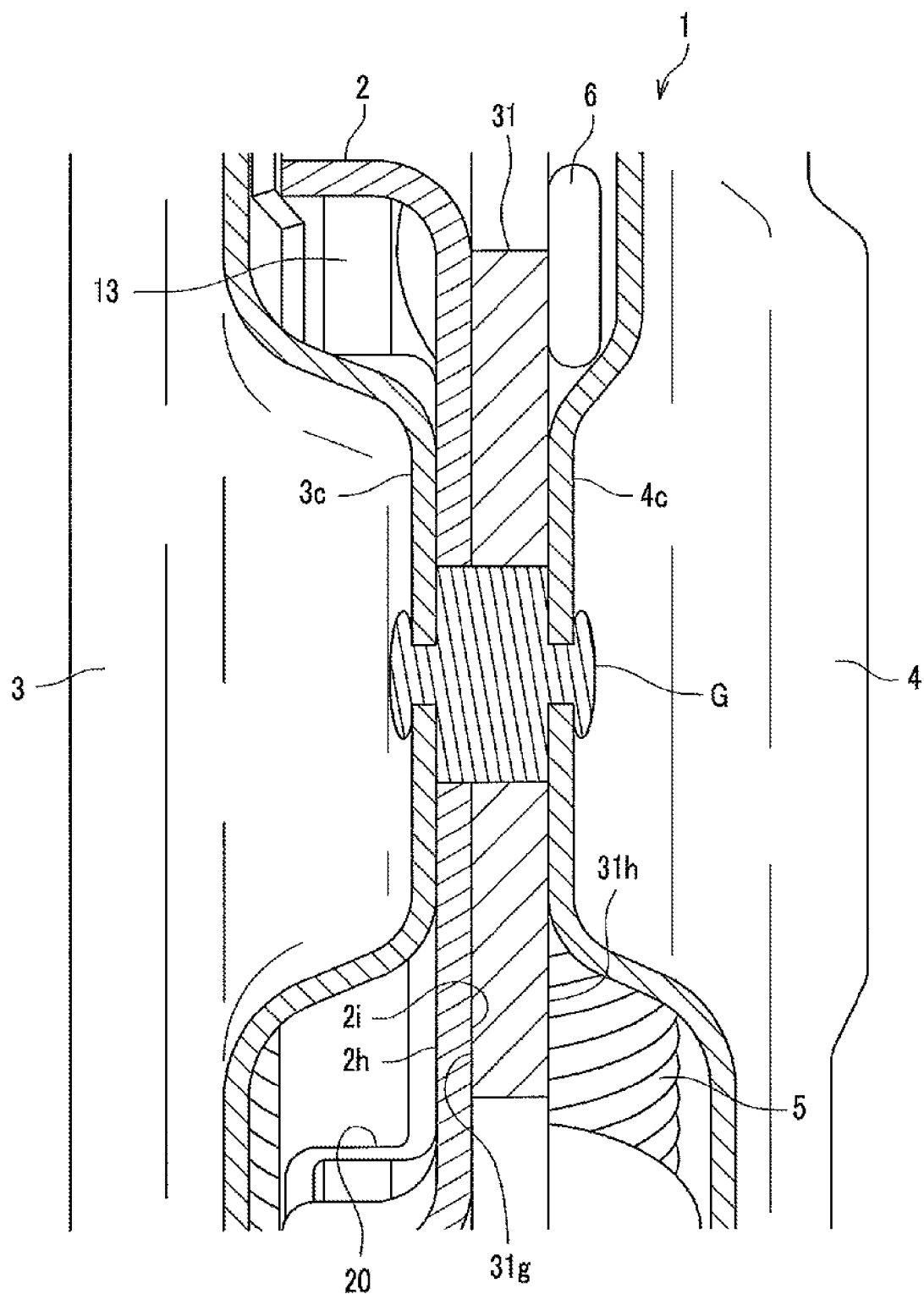
FIG. 10 is a cross-sectional view showing a support structure of a brake pedal in a modified example of the other embodiment of the present invention.

Further, in the embodiment shown in FIGS. 8 and 9, a configuration in which the first projecting portion 3c and the first projecting portion 4c clamp only the ratchet plate 31 has been described as an example, however it is not limited to such a configuration. For example, as a modified example of the other embodiment, as shown in FIG. 10, it may be configured such that without providing the clearance CL in the brake pedal 2, on the outer periphery of the center pin G, the side surface 2i of the brake pedal 2 and the side surface 31g of the ratchet plate 31 are coupled so as to be in surface contact with each other, while the first projecting portion 3c is in surface contact with the side surface 2h of the brake pedal 2, and the first projecting portion 4c is in surface contact with the side surface 31h of the ratchet plate 31, and thus both the brake pedal 2 and the ratchet plate 31 are clamped by the first projecting portions 3, 4.

The present invention is not limited to the embodiments (including the modified examples). For example, in the present embodiment, a configuration in which the cable attachment portion 11 is fixed to the base plates 3, 4 has been described as an example, however, it is not limited thereto, but may be configured such that the cable attachment portion 11 is fixed to the dash panel 100.

Further, the shape of the clearance CL has been circular, however, it is not limited to such a shape, but may be appropriately changed to be triangular, rectangular, or the like.

The invention claimed is:

1. A parking brake device mounted on a vehicle, comprising:
   a brake lever which is rotatable in a predetermined angle range from an initial position with respect to a vehicle body side;
   a pair of base plates which are fixed to the vehicle body side and rotatably supports the brake lever via a rotating shaft;
   a teeth portion which is formed with a plurality of continuous teeth and rotates together with the brake lever;
   a support pin which connects the pair of base plates to each other;
   a pawl portion which is swingably supported by the support pin and meshes with the teeth portion;
   a brake cable which includes an outer cable and an inner cable, in which one end of the outer cable is attached to the pair of base plates via a cable attachment portion, and one end of the inner cable is supported by the brake lever; and
   a cable guide which is provided to the brake lever and is wound with a portion of the inner cable when the brake lever is depressed,
   wherein:
   when the portion of the inner cable is wound on the cable guide, the teeth portion and the pawl portion are located below the portion of the inner cable which is wound on the cable guide;

the pawl portion is located between the rotating shaft and the cable attachment portion;

the pair of base plates comprises:
  a pair of first projecting portions which is disposed on an outer periphery of the rotating shaft; and
  a pair of second projecting portions which is spaced from the pair of first projecting portions and respectively disposed at each end portion of the pair of base plates, and only the brake lever is located between the pair of second projecting portions.

2. The parking brake device according to claim 1,
wherein the rotating shaft is located between the pair of base plates,
wherein the teeth portion is rotatably supported on the rotating shaft, and
wherein the brake lever is supported by the rotating shaft via the teeth portion.

3. The parking brake device according to claim 2,
wherein a thickness at a portion supported on the rotating shaft of the teeth portion is greater than a thickness in the vicinity of the rotating shaft of the brake lever.

4. The parking brake device according to claim 1,
wherein the brake lever has a clearance in a direction perpendicular to an axial direction of the rotating shaft, and is supported on the teeth portion.

5. The parking brake device according to claim 4,
wherein the first projecting portions of the pair of base plates clamp only the teeth portion while one of the first projecting portions is inserted through the clearance.

6. The parking brake device according to claim 1,
wherein the rotating shaft is located between the pair of base plates,
wherein the teeth portion is rotatably supported on the rotating shaft, and
wherein the brake lever and the teeth portion respectively include shaft holes which are flush with each other and slide with respect to the rotating shaft.

7. The parking brake device according to claim 1,
wherein the teeth portion is connected to the brake lever via the connecting pin, and
wherein the connecting pin is located between the first projecting portions and the second projecting portions.

8. The parking brake device according to claim 1,
wherein one end of the inner cable is connected to the brake lever via a pivot pin in a rotatable manner, and
wherein the support pin is located rearward of the inner cable, below the pivot pin, and above the cable attachment portion.

* * * * *